United States Patent
Miyoshi

(10) Patent No.: US 9,819,869 B2
(45) Date of Patent: Nov. 14, 2017

(54) IMAGE SHAKE CORRECTION DEVICE FOR CONTROLLING MOVEMENT OF A MOVABLE MEMBER HOLDING AN IMAGE SHAKE CORRECTION UNIT, AND OPTICAL DEVICE AND IMAGE CAPTURING APPARATUS USING THE SAME

(71) Applicant: CANON KABUSHIKI KAISHA, Tokyo (JP)

(72) Inventor: Kaori Miyoshi, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/925,790

(22) Filed: Oct. 28, 2015

(65) Prior Publication Data

US 2016/0127647 A1 May 5, 2016

(30) Foreign Application Priority Data

Oct. 31, 2014 (JP) .................................. 2014-223353
Jun. 30, 2015 (JP) .................................. 2015-132156

(51) Int. Cl.
*H04N 5/232* (2006.01)
*G02B 27/64* (2006.01)

(52) U.S. Cl.
CPC ....... *H04N 5/23287* (2013.01); *G02B 27/646* (2013.01)

(58) Field of Classification Search
CPC ........................... H04N 5/23287; G02B 27/646

USPC ........................................................ 348/208.4
See application file for complete search history.

(56) References Cited

U.S. PATENT DOCUMENTS

| | | | | |
|---|---|---|---|---|
| 2001/0028516 A1* | 10/2001 | Noguchi | ............... | G02B 27/646 359/823 |
| 2005/0254806 A1* | 11/2005 | Noguchi | .................. | G03B 5/00 396/55 |
| 2010/0067120 A1* | 3/2010 | Miyoshi | ................. | G02B 7/102 359/694 |
| 2012/0249814 A1* | 10/2012 | Miyoshi | ............... | H04N 5/2328 348/208.7 |
| 2013/0170039 A1* | 7/2013 | Miyoshi | ............... | G02B 27/646 359/554 |

FOREIGN PATENT DOCUMENTS

| | | |
|---|---|---|
| CN | 103163708 A | 6/2013 |
| JP | 2001-290184 A | 10/2001 |
| JP | 2007-219338 A | 8/2007 |
| JP | 3969927 A | 9/2007 |

* cited by examiner

*Primary Examiner* — Antoinette Spinks
(74) *Attorney, Agent, or Firm* — Canon U.S.A., Inc. IP Division

(57) ABSTRACT

In an image shake correction device in which a lens holder holding an image shake correcting lens is supported by a ball, the image shake correcting lens is driven in such a manner that the ball does not make sliding contact with the lens holder or does not contact a ball restriction portion during still image capturing. The image shake correction device permits the ball to contact the ball restriction portion during moving image capturing.

3 Claims, 13 Drawing Sheets

IMAGE SHAKE CORRECTION DEVICE FOR CONTROLLING MOVEMENT OF A MOVABLE MEMBER HOLDING AN IMAGE SHAKE CORRECTION UNIT, AND OPTICAL DEVICE AND IMAGE CAPTURING APPARATUS USING THE SAME

BACKGROUND OF THE INVENTION

Field of the Invention

The present invention relates to an image shake correction device having an image stabilization function of preventing image blur caused by undesired motion of a hand holding an image capturing apparatus (hereinafter, camera shake), which is likely to occur in handheld photography. The image shake correction device according to an exemplary embodiment of the present invention can be applied to an image capturing apparatus such as a digital camera and a digital video camera, and an optical device such as an interchangeable lens.

Description of the Related Art

In recent years, many cameras have provided with an image shake correction device to prevent image blur caused by camera shake, which is likely to occur in handheld image capturing. Such an image shake correction device is discussed in, for example, Japanese Patent Application Laid-Open No. 2007-219338.

According to an image shake correction device discussed in Japanese Patent Application Laid-Open No. 2007-219338, a lens frame for holding a correcting lens is held with respect to a base member via three balls.

Moreover, to improve driving performance of an image shake correction device, Japanese Patent No. 3969927 discusses a technique in which a ball member is sandwiched between a lens frame and a base member. The ball member is held in a rollable manner inside a restriction portion.

The restriction portion is provided in such a manner that the ball member does not contact the restriction portion while the lens frame is moving in a maximum movable range thereof.

In recent years, technological advances in an image shake correction device have enabled the image shake correction for a larger camera-shake angle. This increases a movement amount of a correcting lens to correct image shake. On the other hand, the size of the image shake correction device may need to be reduced with reduction in size of a camera.

Accordingly, in a case where a restriction portion for a ball member is provided in a manner discussed in Japanese Patent No. 3969927, a space required for a ball member holding unit increases. Accordingly, such a configuration cannot contribute to size reduction or may leads to less flexibility in design.

SUMMARY OF THE INVENTION

According to an aspect of the present invention, an image shake correction device includes a base member, a movable member configured to hold an image shake correction unit and relatively move in a direction different from an optical axis with respect to the base member, a rolling member, sandwiched between the movable member and the base member, configured to move with respect to the movable member, and a restriction portion, provided corresponding to the rolling member, configured to restrict a movement range of the rolling member, wherein there is a state in which the rolling member contacts an end of the restriction portion during image blur correction operation in moving image capturing, and wherein there is not a state in which the rolling member contacts an end of the restriction portion during image blur correction operation in still image capturing.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Each of the drawings is schematically illustrated. Size and shape of each component are exaggerated as appropriate to facilitate understanding of the component.

In the description below, specific values, shapes, and materials are used. However, these values, shapes, and materials may be changed as appropriate.

Figure 1:
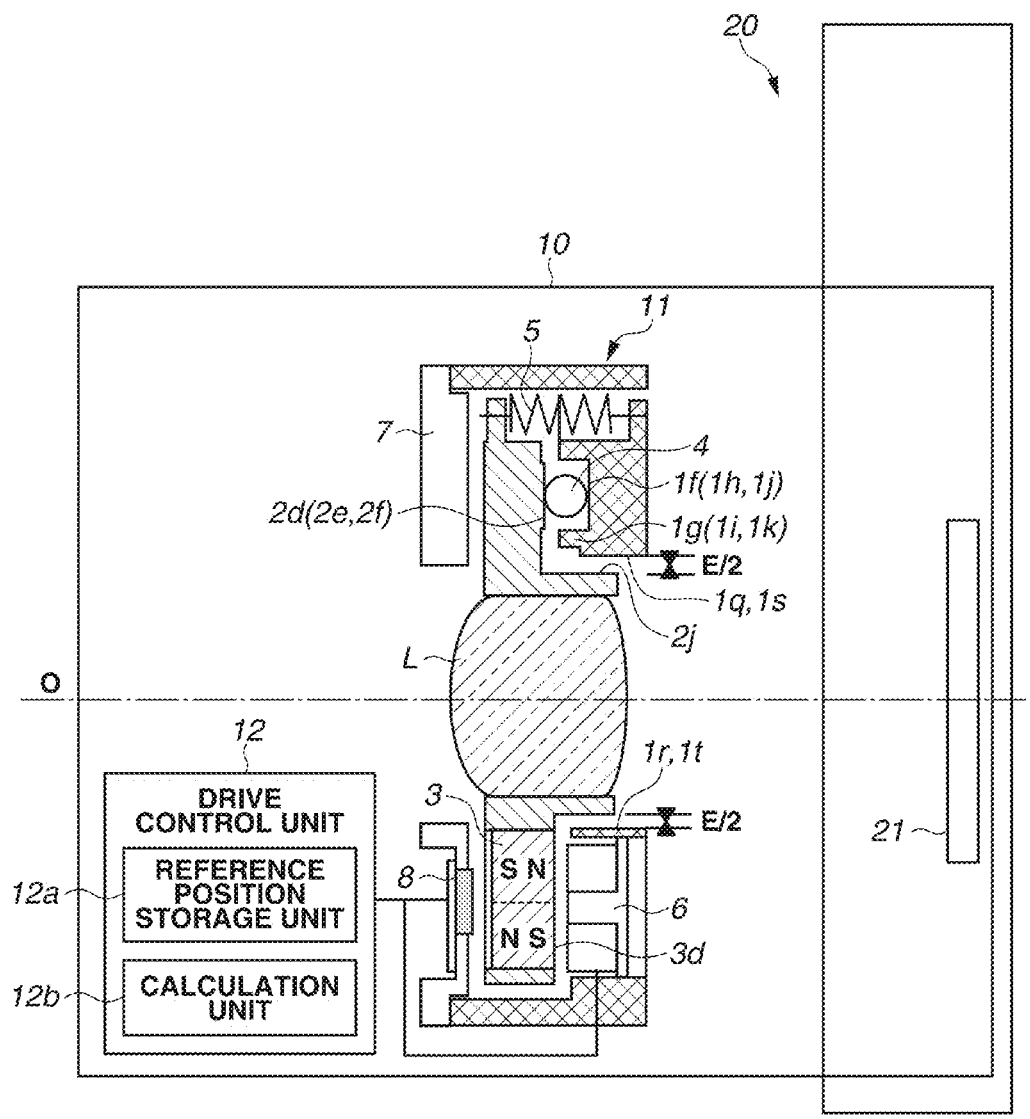
FIG. 1 is a schematic diagram illustrating a camera using an image shake correction device according to an exemplary embodiment of the present invention.
Figure 2:
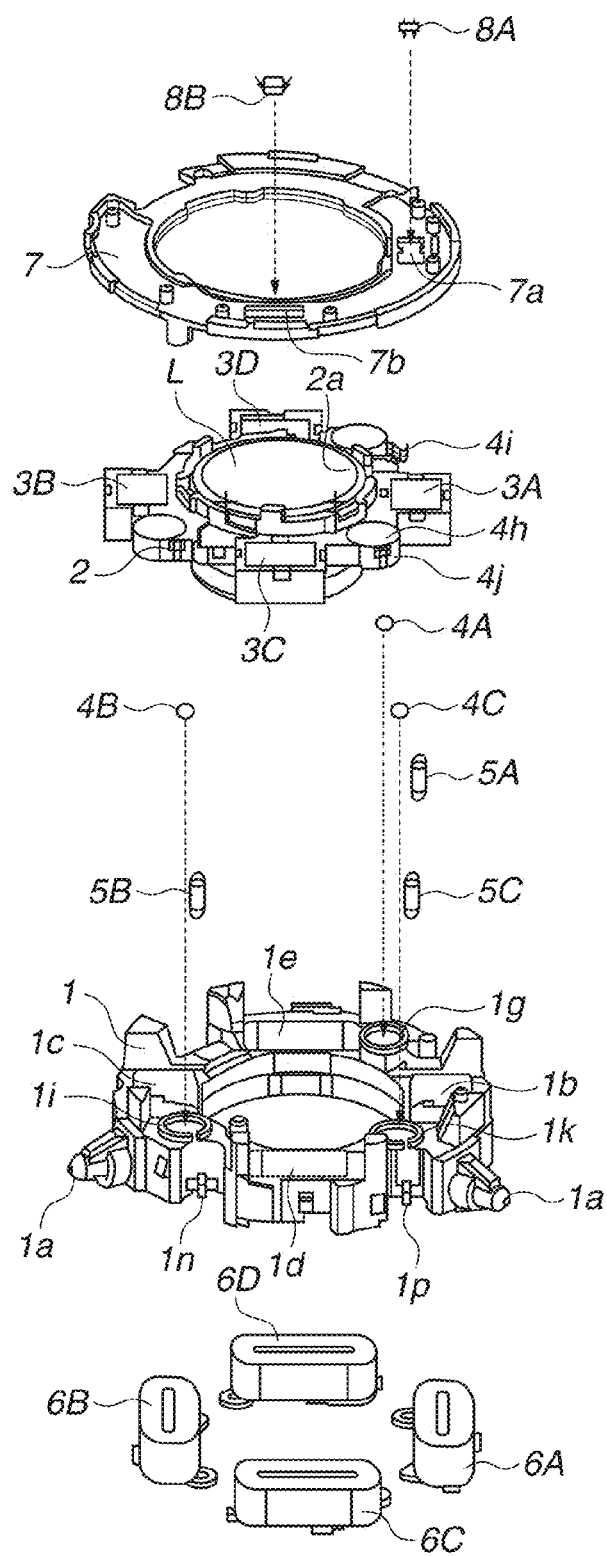
FIG. 2 is an exploded perspective view illustrating a shake correction unit.

Hereinafter, an exemplary embodiment of the present invention is described. FIG. 1 is a schematic sectional view illustrating a camera serving as an image capturing apparatus that employs an image shake correction device according to the present exemplary embodiment. In FIG. 1, a correcting lens L inside a shake correction unit 11 is in a reference position (an initial position).

In the present exemplary embodiment, there is a state in which a ball 4 contacts an end of a restriction portion during image shake correction in moving image capturing, and there is not a state in which the ball 4 contacts the end of the restriction portion during image shake correction in still image capturing.

The image capturing apparatus according to the present exemplary embodiment serves as a digital still camera including a lens barrel 10 and a camera body 20. An optical device according to the present exemplary embodiment includes the shake correction unit 11 and an imaging optical system (not illustrated).

The lens barrel 10 includes the shake correction unit 11 and a drive control unit 12. The camera body 20 includes an image capturing device 21.

The shake correction unit 11 moves the correcting lens L to correct the image shake, or to optionally change an image-pickup field angle. The shake correction unit 11 will be described in detail below.

In addition to the correcting lens L, the lens barrel 10 includes a lens group (not illustrated) that forms the imaging optical system with the correcting lens L.

The drive control unit 12 controls movement of the correcting lens L. The drive control unit 12 includes a reference position storage unit 12a that stores information about an initial position (described below) of the correcting lens L as a reference position.

Moreover, the drive control unit 12 includes a calculation unit 12b. The calculation unit 12b performs calculation to control the driving of the correcting lens L in such a manner that the correcting lens L is driven to a desired position.

The image capturing device 21 serves as an image sensor for capturing an image of a subject acquired through the imaging optical system included in the lens barrel 10. The image capturing element 21 includes a charge-coupled device (CCD) image sensor or a complementary metal-oxide-semiconductor (CMOS) image sensor.

FIGS. 1, 3, 5A, 5B, 5C, 5D, and 5E illustrate example cases in which the correction center of the correcting lens L serving as an image shake correction unit matches the optical axis of the imaging optical system. In the example cases, the center of a ball restriction wall with an inner diameter W matches the reference position of the correcting lens L serving as the image shake correction unit.

Figure 5A:
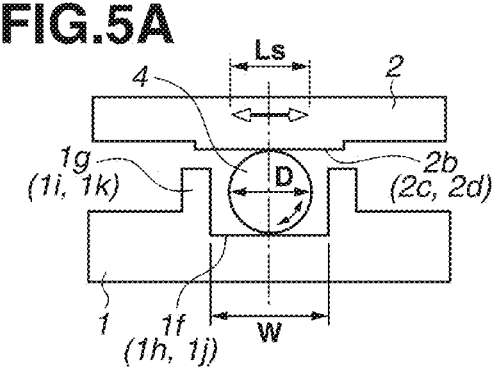
FIGS. 5A, 5B, 5C, 5D, 5E, 5F, 5G, and 5H are schematic diagrams illustrating states in which a ball of the shake correction unit illustrated in FIG. 2 is sandwiched between the base member and the lens holder.
Figure 5B:
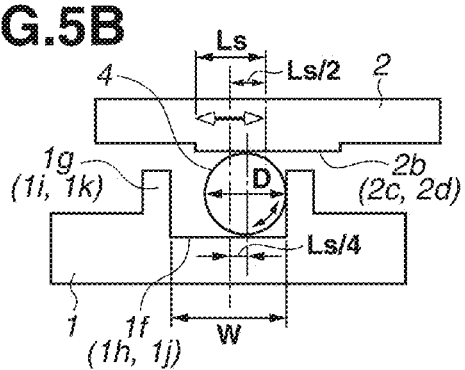
Figure 5C:
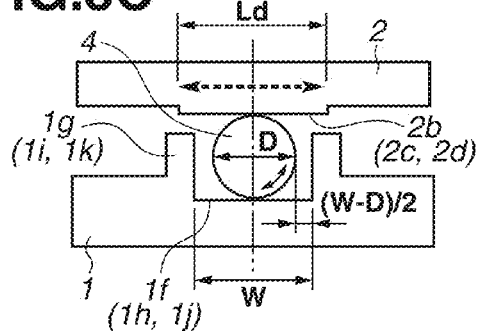
Figure 5D:
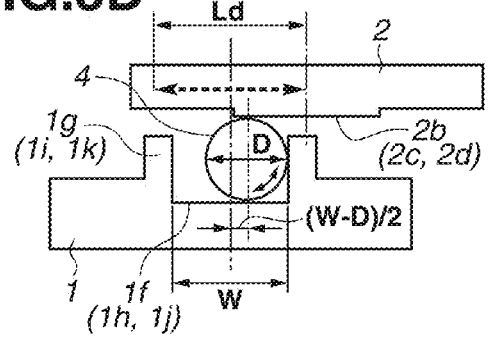
Figure 5E:
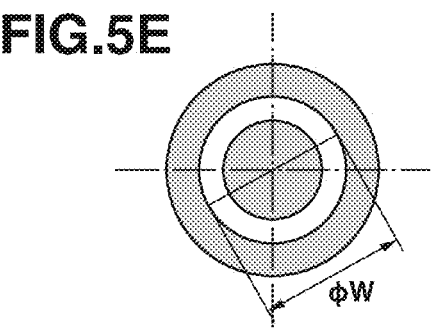
Figure 5F:
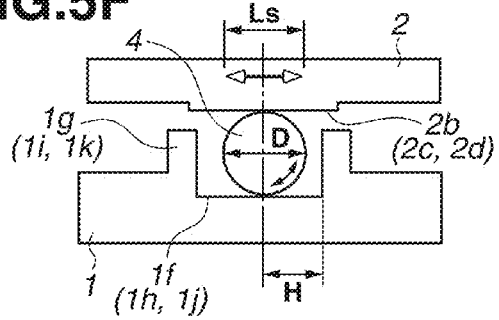
Figure 5G:
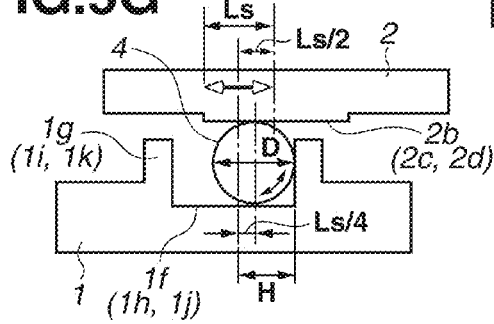
Figure 5H:
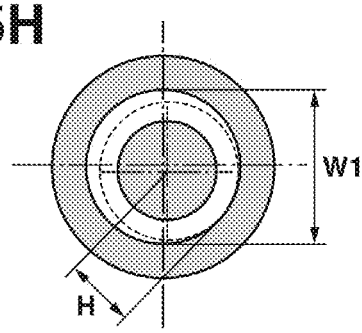

FIGS. 5F, 5G and 5H illustrate example cases in which the center of the ball restriction wall with the inner diameter W does not match the reference position of the correcting lens L serving as the image shake correction unit.

The image shake correction device according to the present exemplary embodiment moves the correcting lens L in a first direction by a first drive unit and a second drive unit. Moreover, the image shake correction device moves the correcting lens L in a second direction by a third drive unit and a fourth drive unit. By moving the correcting lens L in such a manner, the image shake correction device corrects image shake caused by a camera shake, for example.

Moreover, the first drive unit includes a first position detecting unit for detecting a position in the first direction, and the second drive unit includes a second position detecting unit for detecting a position in the second direction. The position detection in the first direction and the second direction is independently controlled.

In addition to the correcting lens L, the shake correction unit 11 includes a base member 1, a lens holder 2, a magnet 3, the ball 4, a tensile spring 5, a coil unit 6, a cover unit 7, and a hall element 8.

Figure 3:
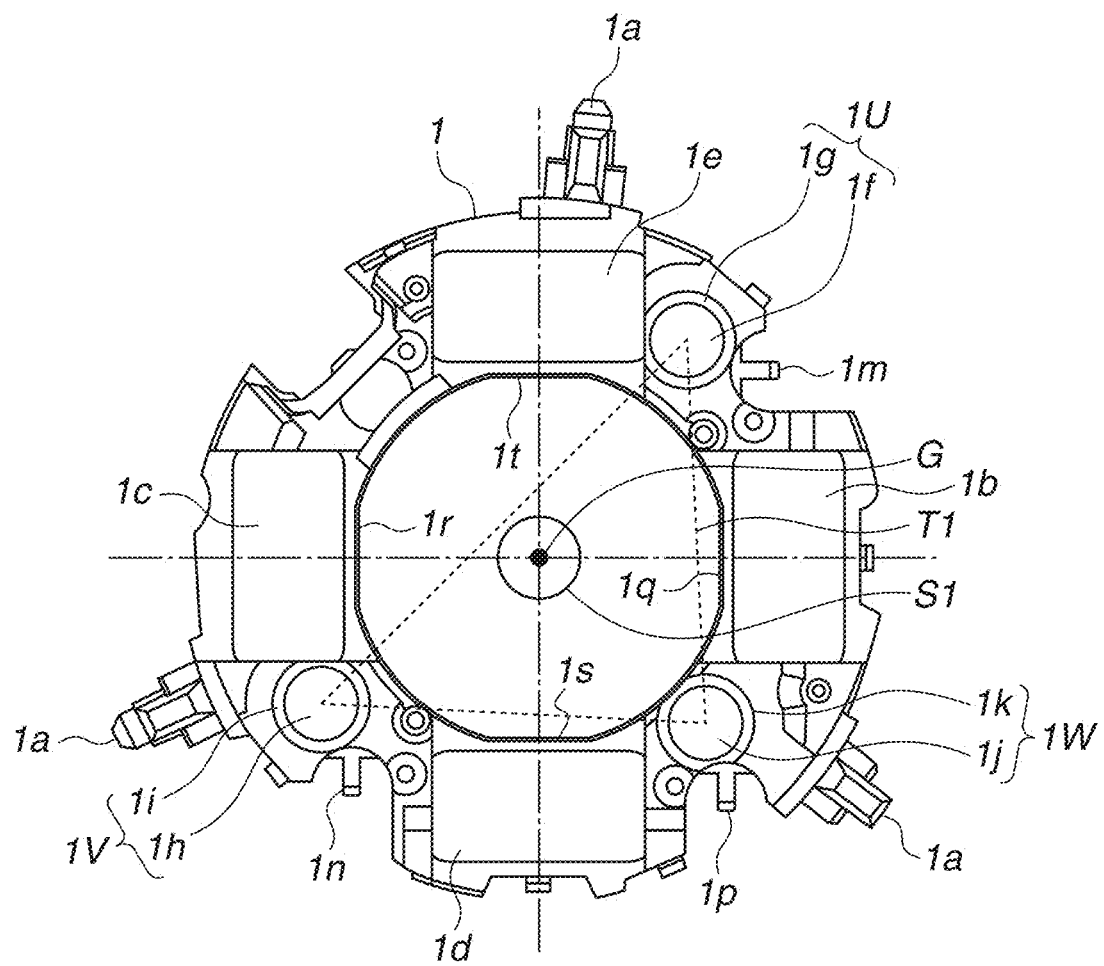
FIG. 3 is a top view illustrating a base member of the shake correction unit illustrated in FIG. 2.

The base member 1 is disposed in a movable manner. The base member 1 can move along an optical axis O along with movement of other lens groups (not illustrated). The base member 1 includes a follower 1a on an outer circumferential portion thereof as illustrated in FIG. 3. The follower 1a engages with a cam groove provided on a cam frame (not illustrated). The follower 1a can move in an optical axis direction along the optical axis O by following the cam groove.

As illustrated in FIG. 3, the base member 1 further includes coil holding portions 1b, 1c, 1d, and 1e, and three ball receiving surfaces 1f, 1h, and 1j for receiving the respective balls 4, which will be described below.

Furthermore, the base member 1 includes latch portions 1m, 1n, and 1p, and annular restriction walls 1g, 1i, and 1k which are arranged to surround the ball receiving surfaces 1f, 1h, and 1j, respectively.

The latch portions 1m, 1n, and 1p are hook-like projections for latching three tensile springs 5, which will be described below.

The coil holding portions 1b, 1c, 1d, and 1e respectively hold coil units 6A, 6B, 6C and 6D, which will be described below.

The lens holder 2, serving as a movable unit, is disposed in a movable manner relative to the base member 1.

The lens holder 2 includes a lens holding portion 2a in the center thereof to hold the correcting lens L in the lens holding portion 2a.

Figure 4:
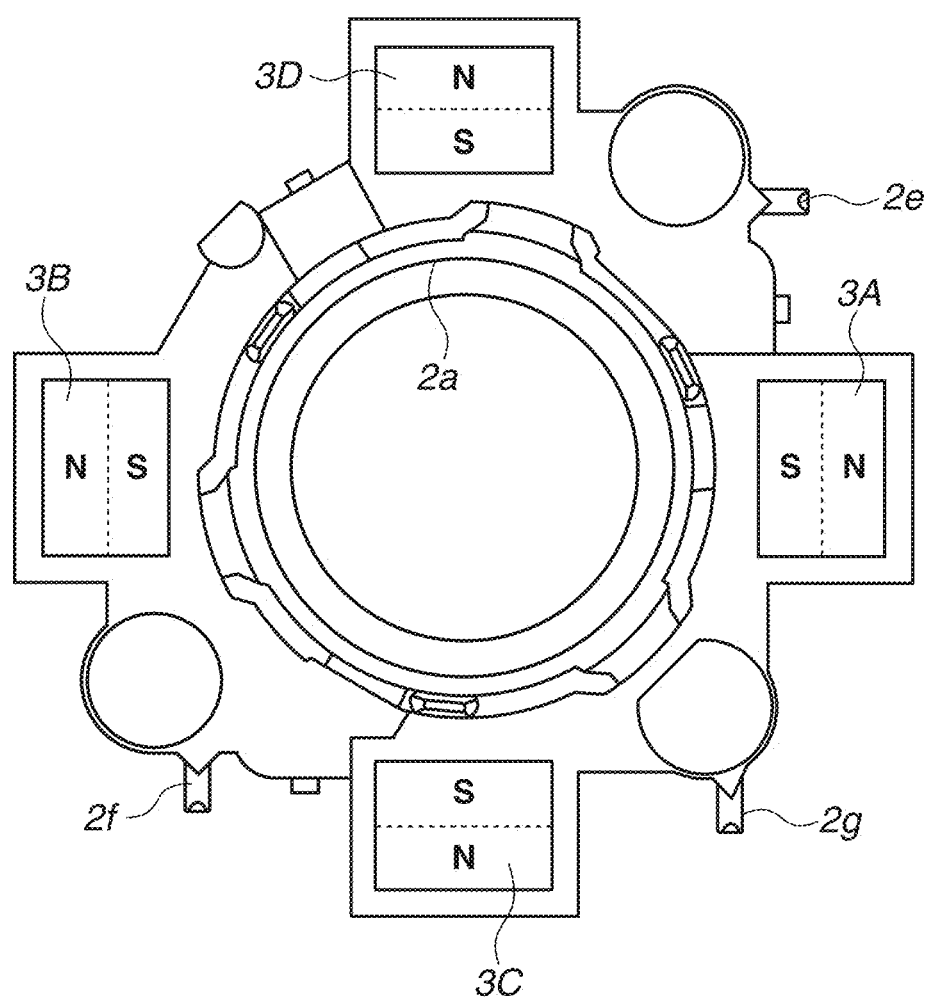
FIG. 4 is a top view illustrating a lens holder of the shake correction unit illustrated in FIG. 2.

Moreover, as illustrated in FIG. 4, a first magnet 3A, a second magnet 3B, a third magnet 3C, and a fourth magnet 3D are held in an outer circumferential portion of the lens holding portion 2a.

Moreover, the lens holder 2 includes ball receiving portions 2b, 2c, and 2d. The receiving portions 2b, 2c, and 2d holds the three balls 4 at the side facing the ball receiving surfaces 1f, 1h, and 1j of the base member 1, respectively. The lens holder 2 further includes hook-like latch portions 2e, 2f, and 2g that latch the three tensile springs 5.

The magnet 3 includes the first magnet 3A, the second magnet 3B, the third magnet 3C, and the fourth magnet 3D. As illustrated in FIG. 1 and FIG. 4, each of the magnets 3A through 3D is flatly magnetized with two poles on its surface. The first magnet 3A and the second magnet 3B are arranged parallel to each other along the first direction with the optical axis O therebetween.

Similarly, the third magnet 3C and the fourth magnet 3D are arranged parallel to each other with the optical axis O therebetween. The third magnet 3C and the fourth magnet 3D are arranged along a second direction which is shifted by 90 degrees in phase from the first direction. In the present exemplary embodiment, while the first magnet 3A, the second magnet 3B, the third magnet 3C, and the fourth magnet 3D have the same size, each of these magnets 3A, 3B, 3C, and 3D may have different size.

The three balls 4 are sandwiched between the base member 1 and the lens holder 2 as illustrated in FIG. 1. More specifically, one ball 4 is arranged in each of a first recessed portion 1U, a second recessed portion 1V, and a third recessed portion 1W. The first recessed portion 1U is formed by the ball receiving surface if and the restriction wall 1g arranged in the base member 1. Similarly, the second recessed portion 1V is formed by the ball receiving surface 1h and the restriction wall 1i, and the third recessed portion 1W is formed by the ball receiving surface 1j and the restriction wall 1k. Shapes and sizes of the restriction walls 1g, 1i, and 1k are described in detail below.

As described above, the lens holder 2 is held via the balls 4 with respect to the base member 1. When the lens holder 2 is moved by the drive unit from a state illustrated in FIG. 5A, the ball 4 inside the recessed portion makes rolling contact with the lens holder 2 within a range where the ball 4 does not contact the restriction wall.

As illustrated in FIG. 5B, when the lens holder 2 is further moved, the ball 4 contacts the restriction wall. In this position, the ball 4 makes sliding contact as illustrated in FIG. 5D. This enables the lens holder 2 to be held in a movable manner.

The ball 4 serving as a rolling member is sandwiched between the lens holder 2 serving as a movable member and the base member 1. The restriction wall serving as a restriction portion is disposed corresponding to the ball 4 serving as the rolling member (FIG. 1).

The tensile spring 5 urges the base member 1 and the lens holder 2 in a direction in which the ball 4 is sandwiched. More specifically, ends of tensile springs 5A, 5B, and 5C are respectively hooked onto the latch portions 1m, 1n, and 1p arranged in the base member 1 and the latch portions 2e, 2fn, and 2g arranged in the lens holder 2, so that the tensile springs 5A, 5B, and 5C urge the base member 1 and the lens holder 2.

The coil unit 6 includes a first coil 6A, a second coil 6B, a third coil 6C, and a fourth coil 6D which are fixed inside the coil holding portions 1b, 1c, 1d, and 1e of the base member 1, respectively. The first coil 6A is arranged in a position facing the first magnet 3A. Similarly, the coils 6B, 6C, and 6D are arranged in positions facing the magnets 3B, 3C, and 3D, respectively.

The coil unit 6 and the magnet 3 function as a drive device. The first coil 6A and the first magnet 3A form a drive unit (hereinafter, referred to as a first drive unit).

When electric current flows through the first coil 6A, magnetic force is generated. The first magnet 3A receives repulsive force or attractive force according to a relation between thus generated magnetic force and magnetic force of the first magnet 3A.

Similarly, the second coil 6B and the second magnet 3B form a drive unit (hereinafter, referred to as a second drive unit). The third coil 6C and the third magnet 3C form a third drive unit. The fourth coil 6D and the fourth magnet 3D form a fourth drive unit.

When the coil unit 6 is energized, each of the second, third, and fourth drive units receives driving force in a similar manner to that of the first drive unit. The description thereof is omitted, accordingly.

An energizing direction to the coil unit 6 is controlled so that a direction in which driving force is generated by the magnet by energization of the coil unit 6 is the same for the first drive unit and the second drive unit. Similarly, an energizing direction to the coil unit 6 is controlled so that a direction in which driving force is generated is the same for the third drive unit and the fourth drive unit.

By controlling an amount of driving force in the first direction and in the second direction, the lens holder 2 can move to a desired position. The first direction is the direction to which the lens holder 2 is moved by the first drive unit and the second drive unit. The second direction is the direction to which the lens holder 2 is moved by the third drive unit and the fourth drive unit The cover unit 7 covers the lens holder 2, and holds a first hall element 8A and a second hall element 8B at a portion 7a and a portion 7b, respectively. The cover unit 7 is fixed to the base member 1.

Each of the first hall element 8A and the second hall element 8B serves as a magnetic sensor for detecting magnetism. The first hall element 8A is disposed in a position substantially facing the boundary between the north pole and the south pole of the first magnet 3A in a state where the lens holder 2 is located at an initial position (a reference position). Similarly, the second hall element 8B is disposed in a position facing the third magnet 3C.

The lens holder 2 together with the magnet 3 relatively moves with respect to the hall element 8, so that the hall element 8 detects a change in magnetic flux as a detection value. The first hall element 8A detects a movement amount in the first direction, and the second hall element 8B detects a movement amount in the second direction.

The calculation unit 12b converts the value detected by the hall element 8 into lens position information. The calculation unit 12b controls movement of the lens holder 2 in each of the first direction and the second direction so that the lens holder 2 is moved to a desired position.

Next, shape and inner diameter of the restriction walls 1g, 1i, and 1k arranged in the base member 1 are described in detail.

In the camera according to the present exemplary embodiment, Ls (mm) refers to a maximum movement amount by which the correcting lens L can be moved to correct an image shake caused by a camera shake during still image capturing, and Ld (mm) refers to a maximum movement amount by which the correcting lens L can be moved to correct an image shake caused by a camera shake during moving image capturing.

The larger the Ls or Ld becomes, the larger the camera-shake correctable angle can be set. However, in practice, the farther the correcting lens L moves from the reference position, the more distortion in an image to be captured or degradation of image quality occurs.

Consequently, when quality of an image to be captured is to be maintained, a movable amount of the correcting lens L is limited to some degree.

In most cases, image distortion or image quality degradation due to movement of the correcting lens L tends to be noticeable in a still image. However, such image distortion or image quality degradation tends to be barely noticeable in a moving image. Hence, a movement amount of the correcting lens L is set so that the following expression is satisfied.

$$Ls\,(\text{mm}) << Ld\,(\text{mm}) \tag{1}$$

For example, Ls=1 mm, and Ld=3 mm.

That is, the shake correction unit 11 needs to be produced in such a manner that the correcting lens L can be driven to move up to Ld. To maintain the rolling contact of the ball 4, which constantly holds the lens holder 2, with the lens holder 2 within the range of the maximum movement amount Ld, the ball restriction walls 1g, 1i, and 1k need to be set so that the following expression is satisfied.

$$Ld/2 + D \leq Wo \tag{2},$$

where D (mm) is the diameter of the ball 4, and Wo is the inner diameter of each of the ball restriction walls 1g, 1i, and 1k.

That is, the greater the Ld is set in the camera, the greater the Wo becomes. This indicates that the sizes of the recessed portions 1U, 1V, and 1W arranged in the base member 1 increase with Ld. For example, if Ld=3 mm and D=1.5 mm, Wo≥3 mm.

As illustrated in the top view of the base member 1 in FIG. 3, it is difficult for the recessed portions 1U, 1V, and 1W each having a relatively large size to be provided in the space unoccupied by the first through the fourth drive units. Consequently, the outer diameter of the image shake correction device needs to be increased. As a result, the arrangement of the larger recessed portions causes a disadvantage in reducing size of lens barrel.

According to the present exemplary embodiment, therefore, the inner diameter W of each of the ball restriction walls $1g$, $1i$, and $1k$ is set so that the following expression is satisfied.

$$Ls/2+D \leq W < Ld/2+D \quad (3)$$

For example, if Ls=1 mm, D=1.5 mm, and Ld=3 mm are applied to the expression (3), a result of $2 \leq W < 3$ is acquired. That is, a minimum inner diameter of the ball restriction wall can be set to 2 mm.

Such setting of the ball restriction wall indicates the following. In the present exemplary embodiment, in a case where movement of the ball 4 is not restricted by the ball restriction wall, Bs refers to an amount of the ball 4 moving by rolling in a maximum movement range Ls in which the lens holder 2 can move during still image capturing.

In a maximum movement range Ld in which the lens holder 2 can move during moving image capturing, Bd refers to an amount of the ball 4 moving by rolling. Moreover, in a maximum movement range E in which the lens holder 2 can mechanically move, Be refers to an amount of the ball 4 moving by rolling.

Herein, each of the movement amounts Bd and Be is an amount of the ball 4 moving by rolling on the assumption that the ball 4 does not contact the ball restriction wall regardless of the inner diameter W of the ball restriction wall.

Moreover, if the ball 4 of the diameter D can move by an amount Bc in the ball restriction wall of the inner diameter W, the following relations are satisfied.

$$Bs=Ls/2$$

$$Bd=Ld/2$$

$$Bs \leq Bc < Bd < Be$$

That is, as illustrated in FIG. 5A while the camera is capturing a still image, the ball 4 does not contact the restriction wall, and the lens holder 2 is supported by the rolling contact of the ball 4.

In contrast, as illustrated in FIG. 5C, when the camera is capturing a moving image, the lens holder 2 is supported by the rolling contact of the ball 4 within a predetermined correction range (which matches a range of the maximum movement amount Ls used when a still image is captured).

Then, when the ball 4 serving as the rolling member passes beyond the predetermined range and contacts the restriction wall in a correction area, the ball 4 does not roll and the lens holder 2 is supported by sliding contact from the position illustrated in Fig D in the correction area.

In a case where the lens holder 2 serving as a movable member is supported, a load while moving is smaller when the lens holder 2 is supported by the rolling contact compared with the sliding contact. Thus, when the lens holder 2 is supported by the rolling contact, movement responsiveness is better.

Therefore, since the performance as the image shake correction device is enhanced, the lens holder 2 is desirably supported by the rolling contact during the image shake correction on a still image in which image quality is important.

However, when a moving image is captured, the responsiveness is not as necessary as when a still image is captured. Even if the lens holder 2 is supported by the sliding contact during the moving image capturing, quality of a captured image is not affected. According to the present exemplary embodiment, therefore, the ball restriction wall serving as the restriction portion is provided so as to satisfy expression (3) described above, and such an arrangement contributes to reduction in size of the image shake correction device.

Moreover, when the lens holder 2 is moved with the ball 4 sliding in contact with the restriction wall serving as the restriction portion as illustrated in FIG. 5B, it is desirable that each of the ball restriction walls $1g$, $1i$, and $1k$ is formed in such a manner that the inner circumferential surface thereof is smooth and continuous. Thus, it is desired that the inner shape of the ball restriction walls $1g$, $1i$, and $1k$ is substantially circular.

The above-described expression is a conditional expression that is applied when a component is produced with high accuracy without an error. In practice, since components are manufactured with error, expression (4) is desirably used so that the ball 4 does not contact the restriction wall during the still image capturing.

$$Ls/2+D < W < Ld/2+D \quad (4)$$

The present exemplary embodiment has been described using the example case in which the center of the ball restriction wall with the inner diameter W and the correction center of the correcting lens L serving as the image shake correction unit match each other.

A case where the center of the ball restriction wall with the inner diameter W and the correction center of the correcting lens L serving as the image shake correction unit do not match each other, will be described with reference to FIGS. 5F, 5G, and 5H.

FIG. 5F is a schematic diagram illustrating a case where the correcting lens L is located at a reference position, and the position of the correcting lens L and the center of the ball restriction wall with an inner diameter W1 do not match each other.

In a case where the center positions do not match as illustrated in FIG. 5F, a distance H that is from the reference position of the image shake correction unit to an end of the restriction wall as illustrated in FIG. 5H is set as follows.

$$(D/2)+(Ls/4) \leq H < (D/2)+(Ld/4) \quad (5)$$

If the ball restriction wall is set so as to satisfy expression (5), the ball 4 does not contact the restriction wall when the correcting lens L moves by the maximum movement amount Ls during the still image capturing as illustrated in FIG. 5G.

Even in such a case, it is desired that the inner shape of the ball restriction wall is substantially circular. The inner diameter W1 has a relation as follows.

$$W1 > 2 \times H$$

Next, a position detection method, a reference position (initial position) determination method, and a centering operation performed by the drive control unit 12 for the shake correction unit 11 are described in detail with reference to FIGS. 1, 5A to 5H, and 6.

The reference position (initial position) of the correcting lens L is set to a position that substantially matches the optical axis O of other lens groups of the camera. In such a state, the drive control unit 12 performs the centering operation in such a manner that the individual balls 4 are positioned substantially in the center of each of the first to third recessed portions of the base member 1 as illustrated in FIG. 5A.

The lens holder 2 serving as the movable member can move in the first direction and the second direction as described above. In the first direction, the lens holder 2 can be driven to move within a range where a tubular portion 2j of the lens holder 2 contacts end surfaces 1q and 1r of the base member 1.

Similarly, in the second direction, the lens holder 2 can be driven to move within a range where the tubular portion 2j of the lens holder 2 contacts end surfaces is and it of the base member 1.

As illustrated in FIG. 1, each of the end surfaces 1q through it of the base member 1 is set to contact the lens holder 2 at a position where the optical axis of the correcting lens L is moved by a predetermined distance from a position that substantially matches the optical axis of the other lens group of the camera.

In the present exemplary embodiment, a maximum distance in which the lens holder 2 can be mechanically moved is referred to as a maximum movable amount E. That is, the lens holder 2 can move in the first direction by a distance E. The lens holder 2 can also move in the second direction by the distance E, where, E>Ld.

When a reference position (initial position) is determined, the drive control unit 12 first causes current to flow through the first coil 6A and the second coil 6B until the lens holder 2 contacts the end surface 1q of the base member 1.

Then, the drive control unit 12 stores an output value (a detection value 1) that the hall element 8 outputs at a position where the lens holder 2 contacts the end surface 1q (this position is a contact position 1).

Subsequently, the drive control unit 12 causes current to flow through the first coil 6A and the second coil 6B until the lens holder 2 contacts the end surface 1r of the base member 1. The drive control unit 12 stores an output value (a detection value 2) that the first hall element 8A outputs at a position where the lens holder 2 contacts the end surface 1r (a contact position 2).

Since each of the contact positions 1 and 2 is separated from the reference position by E/2, the output value of the first hall element 8 in the reference position is determined as a value expressed by the following equation that is calculated by the calculation unit 12b. Reference value=(detection value 1+detection value 2)/2 That is, in a case where the correcting lens L needs to be moved to the reference position, the drive control unit 12 controls energization of the coil unit 6 in such a manner that an output value of the hall element 8 is a reference value calculated from the above expression.

Figure 6:
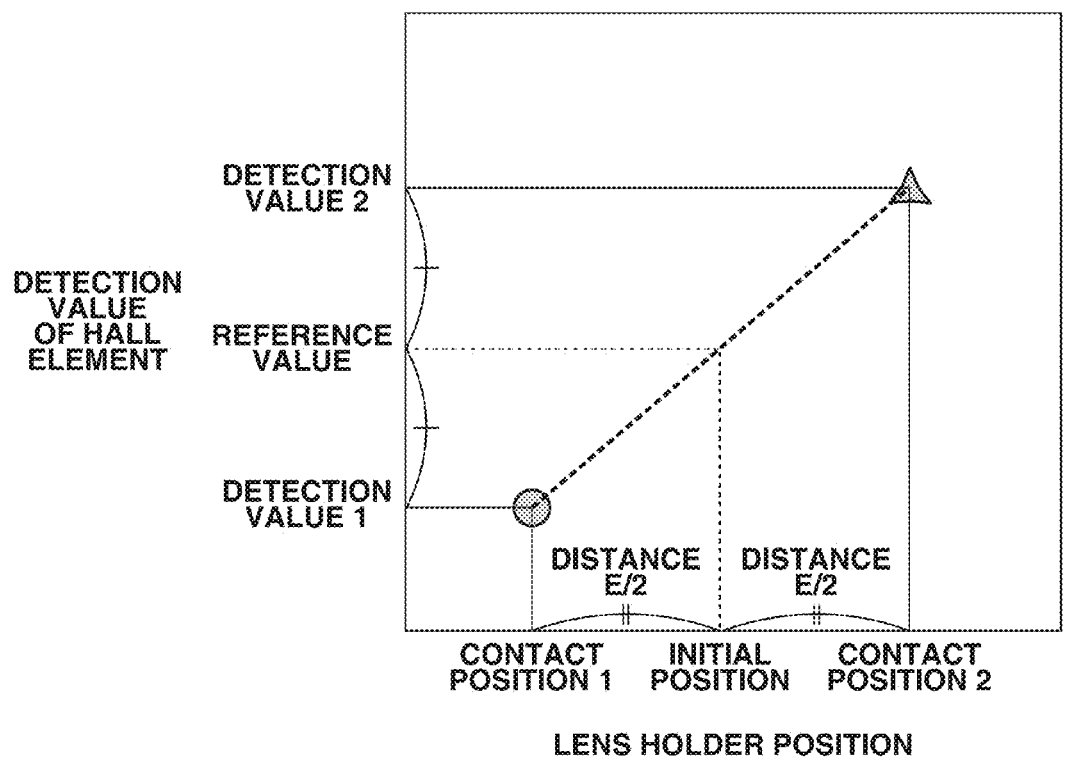
FIG. 6 is a graph illustrating a relation between a position of the lens holder and an output value of a hall element.

Moreover, as illustrated in FIG. 6, a gradient of line representing a relation between a position of the correcting lens L and an output of the hall element is calculated. Such calculation exhibits how much the correcting lens L has moved with respect to the reference position based on the detection value of the hall element 8.

Therefore, the drive control unit 12 performs control for determination of the reference position in such a manner that the correcting lens movement amount corresponding to an amount of the camera shake and the movement amount of the correcting lens L match each other. The movement amount of the correcting lens L is calculated from the output value of the hall element.

The above described method for determining the reference position is one example. Although a reference position can be determined using an optical method instead of using the mechanical method, the description thereof is omitted.

When the reference position has been determined as described above, the drive control unit 12 performs a centering operation. The centering operation enables the balls 4 to be positioned substantially in the center of the respective recessed portions 1U, 1V, and 1W of the base member 1 when the lens holder 2 is in the reference position.

The centering operation is performed as follows.

The maximum movement range of the lens holder 2 serving as the movable member is set to an amount greater than or equal to the maximum movement amount Ls used during the still image capturing based on the reference position determined above.

Then, the lens holder 2 is driven in at least two directions by an amount that is smaller than an amount obtained by subtracting a ball diameter D from the inner diameter W of the ball restriction walls 1g, 1i, and 1k. Alternatively the lens holder 2 is driven to draw a circle having a radius that is larger than Ls and smaller than W−D in the center of the reference position. Subsequently, the lens holder 2 is moved to the reference position.

FIGS. 7A through 7E are schematic diagrams illustrating top views when a centering operation is performed in such a manner that the lens holder 2 is driven to draw a circle having a radius of substantially the same as W−D.

Figure 7A:
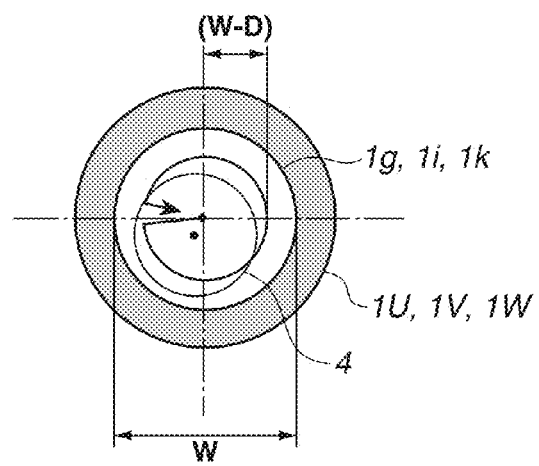
FIGS. 7A, 7B, 7C, 7D, 7E and 7F are schematic top views illustrating a centering operation according to the exemplary embodiment.
Figure 7B:
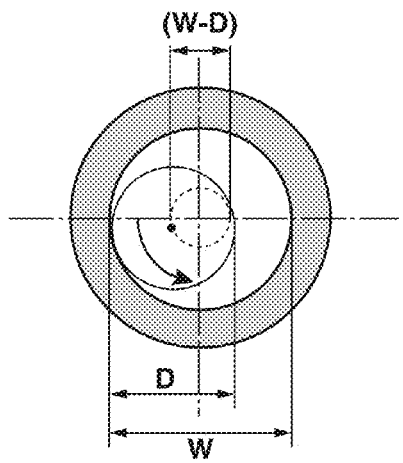
Figure 7C:
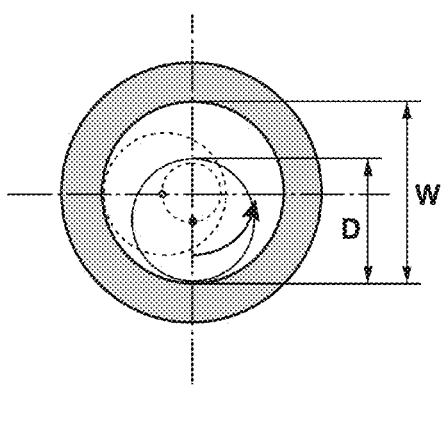
Figure 7D:
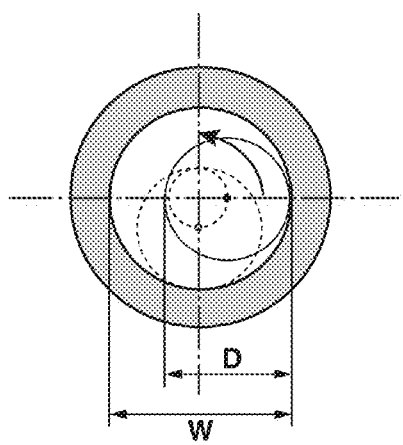
Figure 7E:
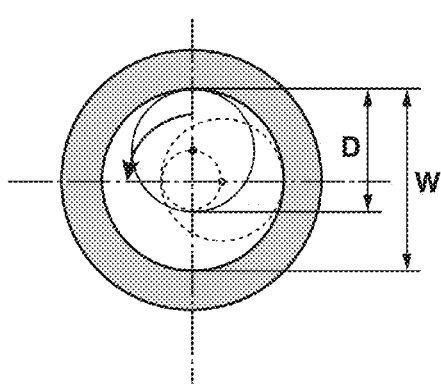
Figure 7F:
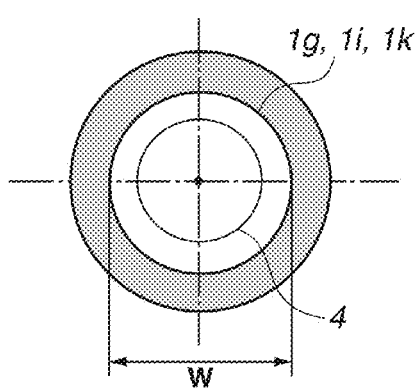

In FIG. 7A, the lens holder 2 is at an initial position, and the ball 4 is not positioned in the center of the ball restriction wall. FIGS. 7B, 7C, 7D, and 7E illustrate sequential states in which the lens holder 2 is moved counterclockwise from the state illustrated in FIG. 7A in such a manner that a circle having a radius (W−D) is drawn as indicated by an arrow.

When the lens holder 2 serving as the movable member is moved in the left direction in the top view from the state illustrated in FIG. 7A, the ball 4 contacts the ball restriction wall before the lens holder 2 is moved by an amount of the radius (W−D). At this position (B), the lens holder 2 is supported by the sliding friction of the ball 4 until the lens holder 2 is moved by the amount of (W−D).

Similarly, when the lens holder 2 is moved counterclockwise by the amount of (W−D), for the (W−D) movement of the lens holder 2, the ball 4 bumps into the restriction wall by an amount which the ball is shifted from the center as illustrated in FIG. 7A. Accordingly, one circular movement is made while a relative position of the lens holder 2 and the ball 4 is being changed. This is referred to as a situation I. On the other hand, the ball 4, which has the diameter D, moving inside the inner diameter W of the ball restriction wall can move by an amount of a diameter (W−D). This is referred to as a situation II.

Moreover, since the ball 4 which supports the lens holder 2 while rolling has a half the movement amount of the lens holder 2, the lens holder 2 can be moved in the circle having the radius (W−D) as described above.

Accordingly, the ball 4 can support the lens holder 2 while rolling in a range of the radius (W−D)/2, that is, a range of a diameter (W−D). This is referred to as a situation III. A result of each of the situations II and III is expressed by the diameter (W−D).

When the lens holder 2 is at the reference position with the ball 4 positioned in the center of the ball restriction wall, one circular movement of the lens holder 2 from the reference position with the radius (W−D) causes the ball 4 to constantly move along the restriction wall. This is referred to as a situation IV.

Therefore, the relative position of the lens holder 2 and the ball 4 is gradually changed by the centering circular movement as in the situation I, and when the lens holder 2 ends one circular movement, the relation becomes the same as the relation described in the situation IV.

Thus, when the lens holder 2 is at the reference position, the ball 4 is at a center position of the ball restriction wall.

The drive control unit 12 performs the centering operation as described above.

In FIGS. 7A through 7F, the centering operation has been described using the example case in which a circle of a radius (W−D) is used. In a next example case, a centering operation is performed using a circle of a radius of Ls/2.

FIGS. 8A through 8F are schematic top views illustrating states in which the lens holder 2 is moved in the circle of the radius Ls/2 in a case where the ball restriction wall has an inner diameter W and the ball 4 has a diameter D.

Figure 8A:
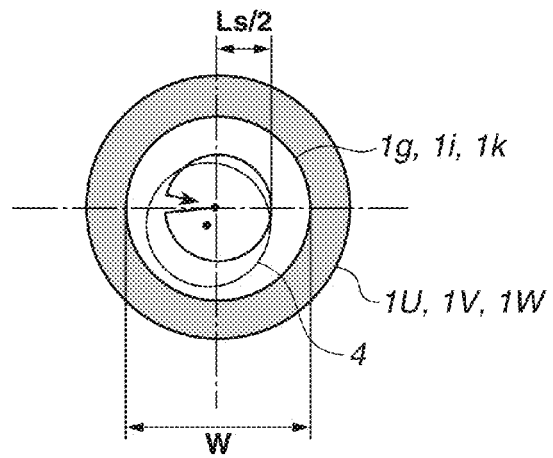
FIGS. 8A, 8B, 8C, 8D, 8E and 8F are schematic top views illustrating a movement radius according to another example of the centering operation illustrated in FIGS. 7A through 7F.

For example, in FIG. 8A, the lens holder 2 is in an initial position, and the ball 4 is not positioned at the center of the restriction wall.

FIGS. 8B, 8C, 8D, and 8E illustrate sequential states in which the lens holder 2 is moved counterclockwise to form a circle having a radius (Ls/2) as indicated by an arrow from the state illustrated in FIG. 8A.

Figure 8B:
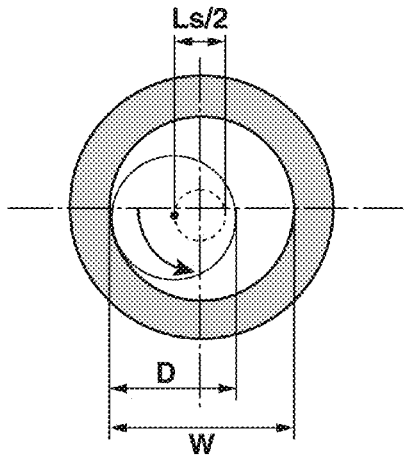
Figure 8C:
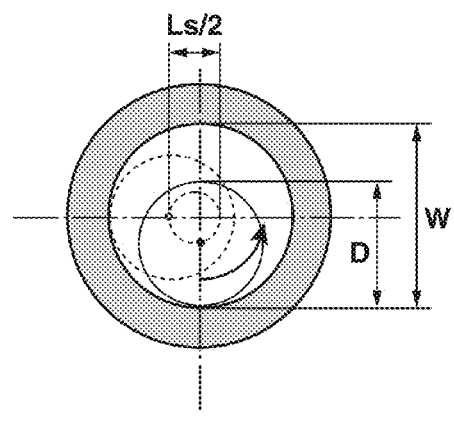

When the lens holder 2 is moved to the left in the top view from the state illustrated in FIG. 8A, the ball 4 contacts the ball restriction wall as illustrated in FIG. 8B. At this position (position B), the lens holder 2 is supported by the sliding friction of the ball 4 until the lens holder 2 is moved by an amount of (Ls/2).

Figure 8D:
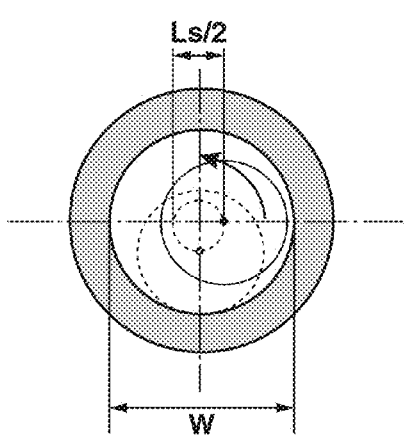
Figure 8E:
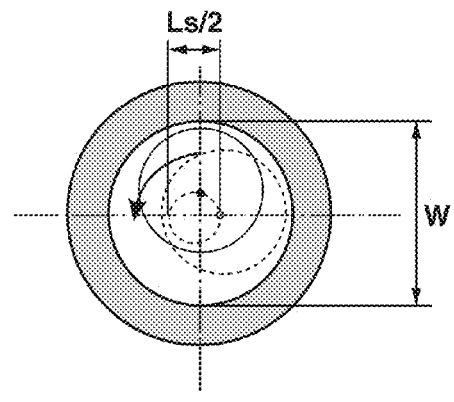

Similarly, when the lens holder 2 is moved counterclockwise by an amount of (Ls), the lens holder 2 is moved to form a circle within a range smaller than the above-described range (W−D). Accordingly, one circular movement is made while there is a range in which the ball does not contact the restriction wall as illustrated in FIG. 8D.

Figure 8F:
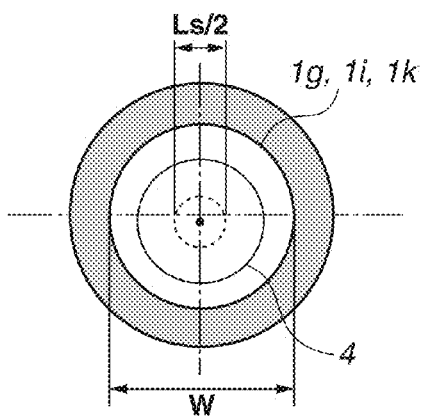

In this state, if the lens holder 2 is moved to the reference position, the ball 4 is positioned as illustrated in FIG. 8F. That is, the ball 4 is not located at the center of the ball restriction wall.

Even in such a case, if the lens holder 2 is moved by Ls/2 from the reference position, that is, a movable amount of the lens holder 2 is in a range of Ls, the ball 4 can roll to support the lens holder 2 without the movement of the ball 4 being stopped by the restriction wall.

Accordingly, the centering operation can be performed from the reference position of the lens holder 2 by using the movement amount in a range S indicated by the following expression.

$$Ls/2 \leq S \leq (W-D)$$

When the lens holder 2 is driven within the maximum movement amount Ls during the still image capturing, the ball 4 can be centered in a position in which the lens holder 2 is supported by rolling movement of the ball 4 without contact of the ball 4 and the restriction wall.

A maximum amount of movement made by the movable member in the centering operation is defined as a maximum movement amount S.

As a result, image stabilization performance performed in the still image capturing can be enhanced in which the centering operation is performed as described above, and the size of the shake correction unit can be reduced.

In addition, the performance of an image stabilization device can be improved, if the ball 4 is positioned as close as possible to the center of the ball restriction wall. In such a case, the radius of the centering operation is desirably a value closer to (W−D).

The basic principle of the centering operation according to the present exemplary embodiment is based on a principle of a reset operation discussed in FIGS. 5A through 5H of Japanese Patent Application Laid-Open No. 2001-290184 (Japanese Patent No. 3969927).

Figure 9:
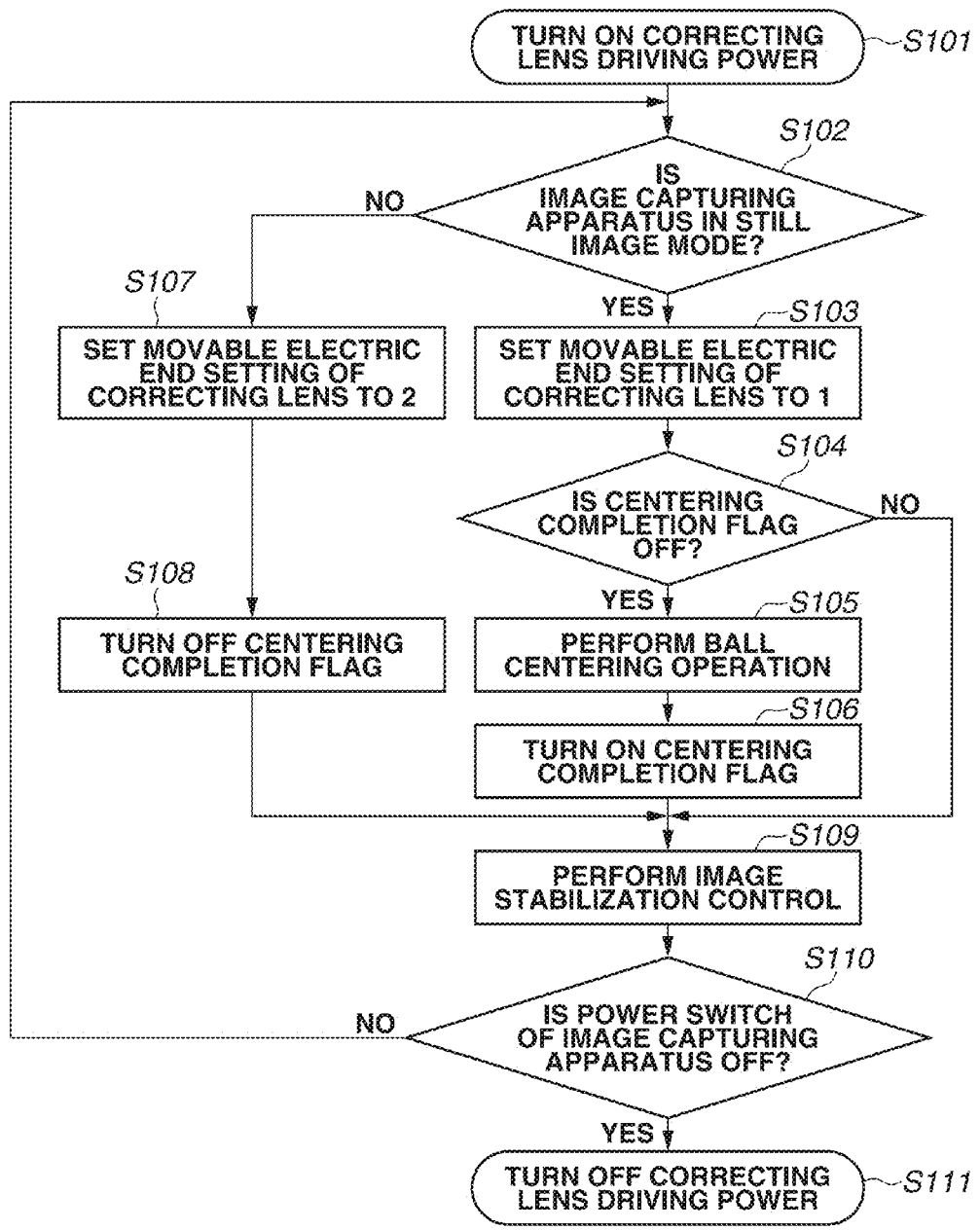
FIG. 9 is a flowchart illustrating processing performed by the image shake correction device according to the exemplary embodiment.

FIG. 9 is a flowchart illustrating processing performed by the image shake correction device according to the present exemplary embodiment. The image shake correction device changes a movement electric end amount of the correcting lens L and the presence or absence of the centering operation according to whether the image capturing apparatus is in a still image capturing mode or a moving image capturing mode.

In step S101, when a correcting lens driving power is turned on, the processing proceeds to step S102. In step S102, the image shake correction device determines whether the image capturing apparatus is in the still image capturing mode.

If the image capturing apparatus is in the still image capturing mode (YES in step S102), the processing proceeds to step S103. If the image capturing apparatus is not in the still image capturing mode (NO in step S102), that is, in the moving image capturing mode, the processing proceeds to step S107.

In step S103, the image shake correction device sets a movable electrical end setting of the correcting lens L to "1". That is, in the present exemplary embodiment, a movable electric end is set to Ls.

Then, the processing proceeds to step S104. In step S104, the image shake correction device determines whether a centering completion flag is off. The centering completion flag indicates whether the correcting lens L is held in a state that a ball centering operation in step S105 has been performed.

If the centering completion flag is off (YES in step S104), the processing proceeds to step S105. If the centering completion flag is on (NO in step S104), the processing proceeds to step S109.

In step S105, the image shake correction device performs the ball centering operation so that the balls 4 are positioned substantially in the centers of the respective recessed portions 1U, 1V, and 1U of the base member 1. The centering operation is performed as described above. When the ball centering operation ends, the processing proceeds to step S106. In step S106, the image shake correction device turns on the centering completion flag. Subsequently, the processing proceeds to step S109.

In step S107, the image shake correction device sets the movable electric end setting of the correcting lens L to "2". In the present exemplary embodiment, a movable electric end is set to Ld. Then, the processing proceeds to step S108.

In step S108, the image shake correction device turns off the centering completion flag.

As described above, in the moving image capturing, an image stabilization control is performed when the ball 4 is in a sliding state after the ball 4 contacts the restriction wall. Accordingly, even if the centering operation of step S105 has been once performed, such a state cannot be maintained.

Accordingly, the centering completion flag needs to be turned off. Then, the processing proceeds to step S109.

According to the present exemplary embodiment, in the still image capturing mode, the ball centering operation of step S105 is performed in an initial time only, and the ball centering operation is omitted in subsequent still image capturing.

In the moving image capturing mode, the image capturing apparatus captures a moving image without the ball centering operation. However, if the image capturing apparatus shifts to the still image capturing mode after the moving image capturing mode, the ball centering operation of step S105 is always performed before a still image is captured.

Subsequently, in step S109, the image shake correction device performs image stabilization control. More specifically, the image shake correction device performs control in such a manner that the correcting lens L is driven to move in the range of the movable electric end which is set according to the amount of shake of the image capturing apparatus so that image shake is corrected. Next, in step S110, the image shake correction device determines whether the power switch of the image capturing apparatus is turned off. If the power switch is not turned off (NO in step S110), the processing returns to step S102 in which the image shake correction device repeats the determination processing. On the other hand, if the power switch is turned off (YES in step S110), the processing proceeds to step S111. In step S111, the correcting lens driving power is turned off and the processing ends.

In the flowchart illustrated in FIG. 9, the ball centering operation is not performed prior to the moving image capturing. However, the ball centering operation described in FIG. 7 may be performed prior to the moving image capturing.

In the moving image capturing, while the image stabilization priority driving is suitably performed in which the ball 4 contacts the ball restriction wall, smoother image stabilization performance can be acquired if the ball 4 contacts the restriction wall less frequently.

Hereinafter, modification examples of the above-described exemplary embodiment of the present invention are described. The present exemplary embodiment has been described using the example case in which the correcting lens L is moved to a plane orthogonal to the optical axis to perform an image shake correction operation.

However, the exemplary embodiment of the present invention is not limited thereto. For example, the correcting lens L may be rotationally moved around a predetermined point (a point C1 on an optical axis in a modification example) to perform an image shake correction operation.

Such a modification example is described in detail. However, components that function similar to those in the above-described exemplary embodiment will be given the same reference numerals as above and description thereof will be omitted.

Figure 10:
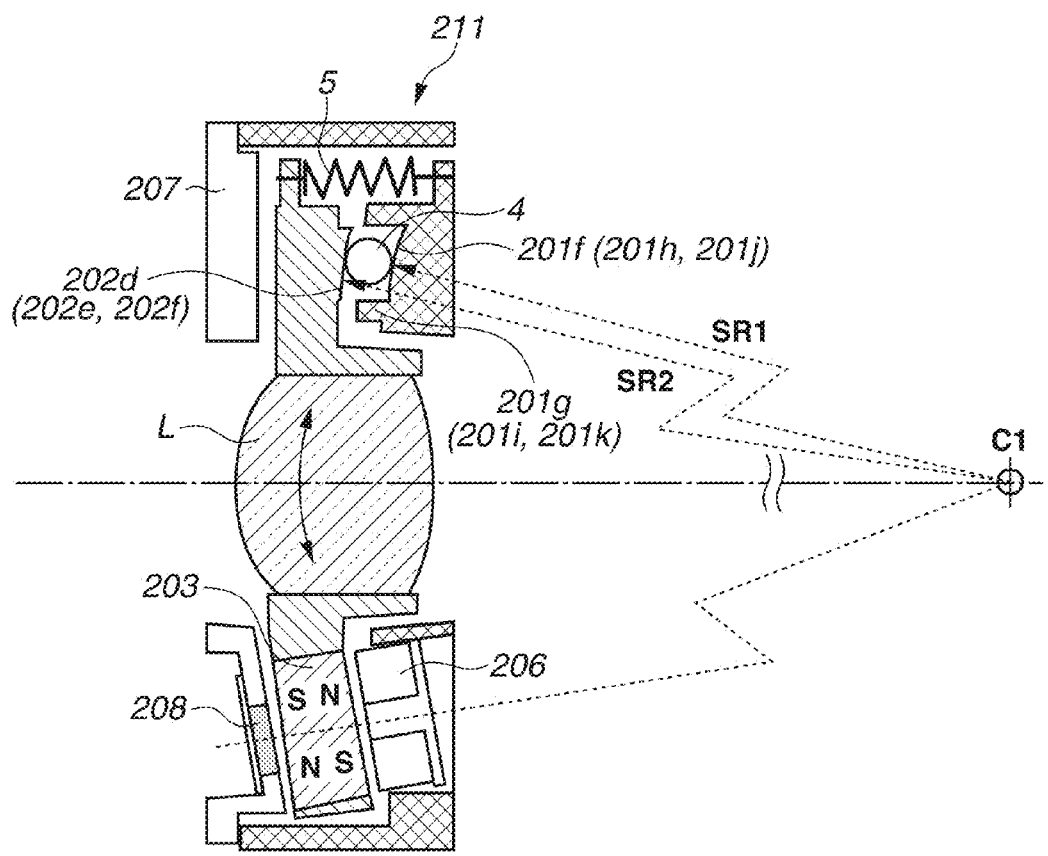
FIG. 10 is a schematic diagram illustrating an image shake correction device according to a modification example of the present invention.

FIG. 10 is a schematic diagram illustrating a shake correction unit 211 according to the present modification example. In particular, FIG. 10 is a schematic sectional view (substantially taken along the arrow of FIG. 11) illustrating a case where a correcting lens L is in a reference position.

In the present modification example, similar to the above-described exemplary embodiment, there is a state in which a ball 4 (rolling ball) contacts an end of a restriction portion during image shake correction in motion image capturing, while the ball 4 does not contact the end of restriction portion during image shake correction operation in still image capturing.

In the image shake correction device according to the present modification example, the correcting lens L can be driven to rotate around the point C1 on the optical axis.

Figure 11:
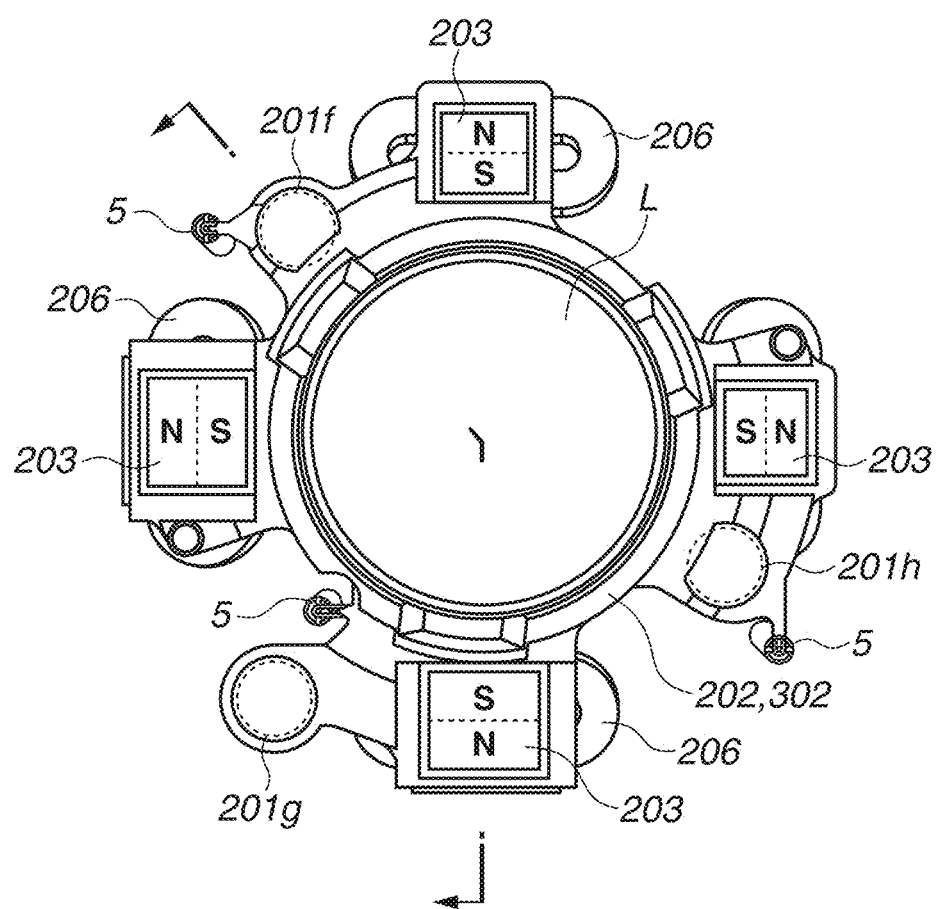
FIG. 11 is a top view illustrating only a lens holder and a coil of the image shake correction device illustrated in FIG. 10.

In a top view as illustrated in FIG. 11, a drive unit including a coil and a magnet moves the correcting lens L in a first direction and a second direction perpendicular to the first direction as in the above-described exemplary embodiment.

Moreover, each drive unit is disposed parallel to a plane perpendicular to a vector toward the rotation center C1 as illustrated in FIG. 10.

Thus, the correcting lens L generates driving force to smoothly move on a spherical surface around the point C1.

In addition to the correcting lens L, the shake correction unit 211 includes a base member 201, a lens holder 202, magnets 203, the balls 4, tensile springs 5, coil units 206, a cover unit 207, and hall elements 208.

The base member 201 includes three ball receiving surfaces 201$f$, 201$h$, and 201$j$ for receiving the respective balls 4, and annular restriction walls 201$g$, 201$i$, and 201$k$ arranged to surround the ball receiving surfaces 201$f$, 201$h$, and 201$j$, respectively.

Each of the ball receiving surfaces 201$f$, 201$h$, and 201$j$ forms a part of the spherical surface of a radius SR1 formed around the point C1.

In the lens holder 202, ball receiving portions 202$d$, 202$e$, and 202$f$ are each held at a position in which the ball 4 is sandwiched between the base member 201 and the lens holder 202.

Each of the ball receiving portions 202$d$, 202$e$, and 202$f$ forms a part of a spherical surface of a radius SR2 around the point C1.

The ball 4 can move while being held and sandwiched between the surfaces each of which forms a portion of the spherical surface around the point C1.

Accordingly, the correcting lens L can move on the spherical surface around the point C1, thereby correcting image shake.

In the present modification example, the drive unit is disposed in an inclined manner with respect to the drive unit according to the above-described exemplary embodiment. However, since the mechanism thereof is similar to the above-described embodiment, description thereof is omitted.

Similar to the above-described exemplary embodiment, the lens holder 202 is held via the ball 4 with respect to the base member 201.

Accordingly, when the lens holder 202 is moved by the drive unit, the ball 4 inside a recessed portion makes rolling contact in a range where the ball 4 does not contact a restriction wall.

Moreover, when the lens holder 202 is moved, the ball 4 makes sliding contact with the lens holder 202 in the incoming position and holds the lens holder 202 to be movable.

Similar to the above-described exemplary embodiment, the size of the ball restriction wall is determined.

In the present modification example, values converted into movement amounts at a position of the ball 4 are used as values of Ls and Ld, which are applied to expressions 1 through 5 described above, instead of correction movement amounts of the correcting lens L.

As described above, determination of the size of the ball restriction wall contributes to reduction in size of the shake correction unit. Moreover, drive performance can be enhanced by following reasons.

Each of the three ball receiving surfaces 201$f$, 201$h$, and 201$j$ of the base member 201 and the respective corresponding ball receiving portions 202$b$, 202$c$, and 202$d$ of the lens holder 202 forms a part of the respective spherical surfaces formed around the point C1.

If these six spherical surfaces are manufactured without an error, the correcting lens L is driven to move on an ideal spherical surface around the point C1.

However, in practice, the formation of spherical surface with accuracy is more difficult than that of plane. In such a state, an area of the ball receiving surface and an area of the ball receiving portion increase.

As the movement amount of the ball increases, deviation in the movement of the correcting lens L from the ideal spherical surface increases.

Figure 12:
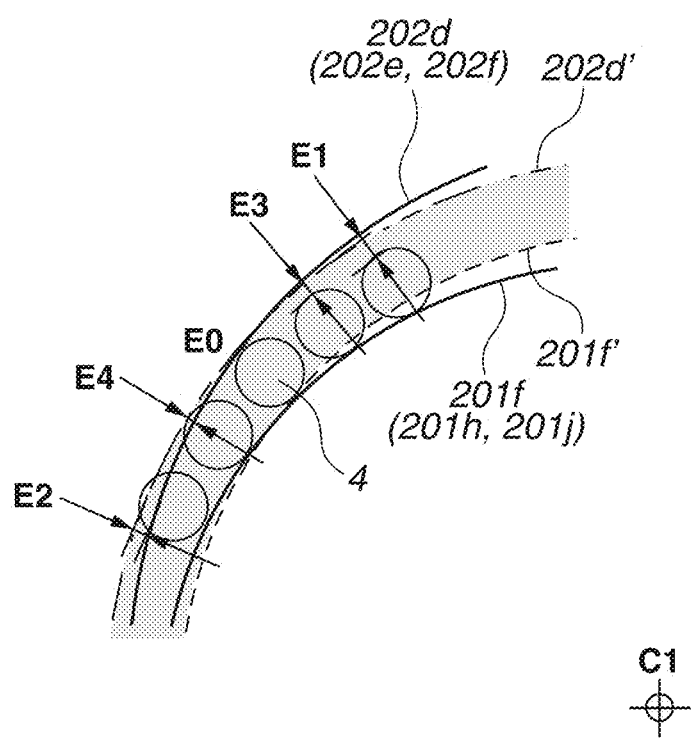
FIG. 12 is a schematic diagram illustrating a ball receiving surface of the image shake correction device illustrated in FIG. 10.

Such a relation is described with reference to FIG. 12. FIG. 12 is a schematic diagram illustrating only the ball 4 and a spherical surface R of the ball receiving surface, being exaggerated.

In FIG. 12, the ball receiving surface 201$f$ (since the ball receiving surfaces 201$h$ and 201$j$ are similar to the ball receiving surface 201$f$, description thereof is omitted) is arranged in the base member 201.

A theoretical curved surface 201$f'$ is provided if the correcting lens L is driven to move on the spherical surface to draw a circle having a radius SR1 around the center point C1.

Similarly, the ball receiving portion 202$d$ (the ball receiving portions 202$e$ and 202$f$ are similar to the ball receiving surface 201$d$) is formed in the lens holder 202. A theoretical curved surface 202$d'$ is provided if the correcting lens L is moved on the spherical surface to draw a circle having a radius SR2 around the center point C1.

Accordingly, the correcting lens L needs to move within a gray area illustrated in FIG. 12 to theoretically move on the spherical surface around the point C1.

In practice, since the spherical surface cannot be formed as theoretically designed, there is an error between the spherical surface and the theoretical curved surface.

Such an error causes the correcting lens L to move with an error from the ideal curved surface. The larger the deviation becomes the more optical performance degrades.

An error amount is E0 when the correcting lens L is in a reference position. It is assumed that the correcting lens L is in an ideal position when the error amount is E0. The error amounts differ, for example, E1 through E5, depending on positions of the ball 4.

If the ball 4 moves a relatively large distance while rolling from the reference position according to the movement of the correcting lens L, the error amount is E1 or E2.

However, if a movement amount of the ball 4 is small, the error amount is E3 or E4. Generally, the following relations are satisfied.

$E1 > E3$ and $E2 > E4$

Therefore, if a movement amount of the ball 4 is smaller, a movement error amount of the correcting lens L with respect to the ideal curved surface becomes smaller, so that the image shake correction device can have enhanced optical performance.

According to the present modification example, therefore, the ball restriction wall is provided so that the ball 4 is supported by rolling contact and sliding contact when the image capturing apparatus is capturing a moving image.

Even if a movement amount of the correcting lens L is large, restriction on a rolling range of the ball 4 can enhance optical performance.

A modification example of such a case is described with reference to FIG. 13.

Figure 13:
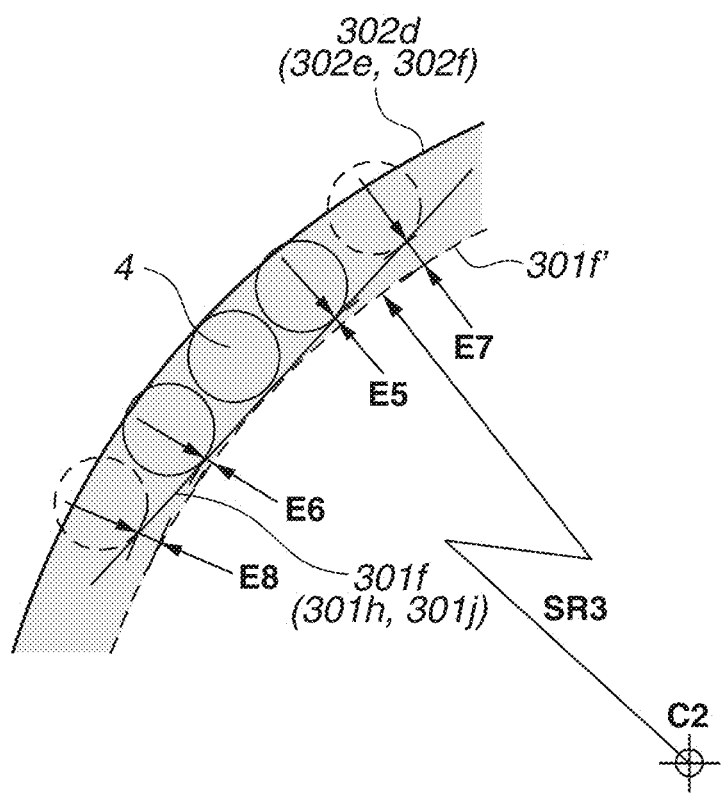
FIG. 13 is a schematic diagram illustrating a ball receiving surface according to a modification example of the present invention.

FIG. 13 is a schematic diagram illustrating only an area around a ball receiving portion as illustrated in FIG. 12.

Similar to the above-described modification example, a correcting lens L moves on a spherical surface around a predetermined point.

Thus, in an image capturing apparatus performing image shake correction, at least one of a ball receiving surface provided in a base member and a ball receiving portion provided in a lens holder is a plane.

In the present modification example, a ball receiving surface 301$f$ (301$h$, 301$i$) provided in a base member 301 is a plane, and a ball receiving portion 302$d$ (302$e$, 302$f$) provided in a lens holder 302 is formed in a spherical surface having a center point C2.

As described above, the restriction on a movement amount of the ball 4 can reduce an area of the ball receiving surface.

Within a small area of the ball receiving surface, an error between an ideal curved surface and the ball receiving surface 301$f$ can be minimized. Herein, the ideal curved surface refers to a circle of a radius SR3 which is drawn around the point C2.

As for production of a component, processing accuracy of a plane is higher than that of a spherical surface.

Accordingly, as described in the present modification example, the ball receiving surface is a plane as a substitute for a spherical surface to improve the processing accuracy.

According to the present modification example, reduction in the area of the ball receiving surface enables an error amount of the correcting lens L with respect to the ideal spherical surface movement of the correcting lens L to be reduced as small as possible.

When the movement range of the ball 4 is increased, the error amount with respect to the ideal position is increased, for example, to E7 or E8 as illustrated in FIG. 13. In such a case, use of the ball receiving surface having a plane as a substitute for a spherical surface is difficult.

In the present modification example, the point C2, which is the rotation center of the correcting lens L, is large enough. Thus, an error with respect to the ideal curved surface in the ball receiving range is, for example, within approximately several tens microns, the ideal curved surface being provided if a circle having a radius SR3 is drawn around the point C2.

Consequently, the present modification example is applied if the error corresponds an error amount in a range in which optical performance is not affected.

The present invention is not limited to the above-described exemplary embodiments including the modification examples. The present invention encompasses various modification examples and alternations, and such modifications and alternations are within the scope of the present invention.

(1) The exemplary embodiment and the modification examples have been described using an example case in which the correcting lens L is moved to perform an image shake correction operation. However, such a configuration is not limited thereto. For example, the image capturing apparatus may be moved to perform an image shake correction operation.

(2) The exemplary embodiment and the modification examples have been described using a camera, as an example, which is particularly directed to capturing a still image and a moving image. However, it is not limited thereto. The above-described exemplary embodiment may be applied to other types of image capturing apparatuses.

(3) In the exemplary embodiment and the modification examples, a coil and a magnet are used as a drive unit for driving the correcting lens L. Alternatively, any drive device may be used.

(4) Moreover, in the exemplary embodiment and the modification examples, two drive units are disposed to drive the correcting lens L in a first direction, and other two drive units are disposed to drive the correcting lens L in a second direction. Alternatively, one drive unit for each direction may be disposed. The first direction and the second direction may not necessarily be orthogonal to each other.

(5) The inner shape of each of the ball restriction walls 1g, 1i, and 1k may be a polygon such as a regular octagon instead of a circle as seen from an optical axis direction. However, since the ball 4 contacts the ball restriction wall in moving image capturing, the inner shape of the ball restriction wall is desirably a circle, which enables the ball to smoothly move after the ball has contacted the ball restriction wall.

(6) In the exemplary embodiment and the modification examples, a centering operation is performed only prior to still image capturing after a moving image is captured. However, the centering operation may always be performed prior to moving image capturing to further enhance moving image capturing performance. In such a case, a radius of the centering operation is desirably a value closer to (W−D).

(7) In the exemplary embodiment and the modification examples, the ball 4 is supported by the rolling contact and the sliding contact with the lens holder 2 during moving image capturing.

For example, the ball 4 may support the lens holder 2 only by the rolling contact with the lens holder 2 in a first image capturing mode, while the ball 4 may supports the lens holder 2 by the rolling contact and the sliding contact with the lens holder 2 in a second image capturing mode.

The term "first image capturing mode" used herein includes an image capturing mode that is used, for example, based on the assumption that a shake angle of an image capturing apparatus is within a predetermined angle and a photographer is capturing an image while being motionless.

The term "second image capturing mode" used herein includes an image capturing mode that is used based on the assumption that a shake angle of an image capturing apparatus is a predetermined angle or greater and a photographer is walking or running.

According to the exemplary embodiments of the present invention, in the image shake correction device in which the lens holder 2 holding the correcting lens L is supported by the ball 4, the lens holder 2 is supported by the ball 4 by the rolling contact with the lens holder 2 during still image capturing by the image capturing apparatus.

Moreover, the ball restriction wall is provided, so that the lens holder 2 is supported by the ball 4 by rolling contact and sliding contact with the lens holder 2 during moving image capturing operation of the image capturing apparatus. As a result, even in a case where a moving amount of the correcting lens L is large, the size of the image shake correction device does not increase.

Moreover, driving performance of the image shake correction device can be further stabilized because of enhanced design flexibility.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-223353, filed Oct. 31, 2014, and No. 2015-132156, filed Jun. 30, 2015, which are hereby incorporated by reference herein in their entirety.

What is claimed is:

1. An image shake correction device comprising:
a base member;
a movable member configured to hold an image shake correction unit and relatively move in a direction different from an optical axis with respect to the base member;
a rolling member, sandwiched between the movable member and the base member, configured to move with respect to the movable member;
a restriction portion, provided corresponding to the rolling member, configured to restrict a movement range of the rolling member; and
a drive control unit configured to control movement of the movable member,
wherein the drive control unit is configured to move the movable member within a range including a range where the rolling member contacts an end of the restriction portion during image shake correction operation in moving image capturing,
wherein the drive control unit is configured to move the movable member within a range where the rolling member does not contact the end of the restriction portion during image shake correction operation in still image capturing,
wherein an expression of $(D/2)+(Ls/4) \leq H < (D/2)+(Ld/4)$ is satisfied, where H is a distance from an initial position of the image shake correction unit to the end of the restriction portion, Ls is a maximum movement amount of the movable member for image shake correction during still image capturing, Ld is a maximum movement amount of the movable member for image shake correction during moving image capturing, and D is a diameter of the rolling member, and
wherein, if image shake correction that is performed during the still image capturing is performed after an image shake correction operation that is performed during the moving image capturing is performed, a centering operation for moving the rolling member away from an end of the restriction portion satisfies a conditional expression of $Ls/2 \leq S \leq (W-D)$, where S is a maximum movement of the movable member when the centering operation is performed, and W is an inner diameter of the restriction portion.

2. The image shake correction device according to claim 1, wherein a shape of the restriction portion is a circle as seen from an optical axis direction.

3. The image shake correction device according to claim 1, wherein an expression of $(Ls/2)+D < W < (Ld/2)+D$ is satisfied.

* * * * *